(12) United States Patent
Burrowes et al.

(10) Patent No.: US 8,795,456 B2
(45) Date of Patent: Aug. 5, 2014

(54) FABRIC ADHESION IMPROVEMENT FOR EPDM BASED LOW COST TIMING BELT

(75) Inventors: Thomas George Burrowes, North Canton, OH (US); Michael John William Gregg, Lincoln, NE (US)

(73) Assignee: Veyance Technologies, Inc., Fairlawn, OH (US)

( * ) Notice: Subject to any disclaimer, the term of this patent is extended or adjusted under 35 U.S.C. 154(b) by 202 days.

(21) Appl. No.: 13/024,624

(22) Filed: Feb. 10, 2011

(65) Prior Publication Data

US 2011/0126964 A1 Jun. 2, 2011

Related U.S. Application Data

(62) Division of application No. 11/026,786, filed on Dec. 31, 2004, now Pat. No. 7,909,720.

(51) Int. Cl.
*B32B 37/12* (2006.01)
*F16G 1/04* (2006.01)

(52) U.S. Cl.
USPC .......................................................... 156/138

(58) Field of Classification Search
USPC ................................... 156/138; 474/266, 267
See application file for complete search history.

(56) References Cited

U.S. PATENT DOCUMENTS

| | | | |
|---|---|---|---|
| 4,604,081 A | 8/1986 | Mashimo et al. | 474/205 |
| 4,956,036 A | 9/1990 | Sedlacek | 156/137 |
| 5,609,243 A | 3/1997 | Fujita et al. | 198/847 |
| 5,610,217 A | 3/1997 | Yarnell et al. | 524/397 |
| 6,294,600 B1 | 9/2001 | Takada et al. | 524/105 |
| 6,296,588 B1 | 10/2001 | Ciemniecki et al. | 474/268 |
| 6,403,722 B1 | 6/2002 | Severe et al. | 525/213 |
| 6,491,598 B1 | 12/2002 | Rosenboom | 474/260 |
| 6,524,417 B2 | 2/2003 | Hasaka et al. | 156/137 |
| 6,641,905 B1 | 11/2003 | Fujimoto et al. | 428/297.4 |
| 6,656,073 B1 | 12/2003 | DeMeco et al. | 474/267 |
| 6,693,145 B2 * | 2/2004 | Graf et al. | 524/495 |
| 6,695,733 B2 | 2/2004 | Knutson | 474/260 |
| 2001/0051555 A1 | 12/2001 | Isshiki et al. | 474/263 |
| 2002/0132692 A1 * | 9/2002 | Knutson | 474/263 |
| 2003/0050144 A1 | 3/2003 | Moncrief et al. | 474/263 |
| 2005/0113200 A1 | 5/2005 | Okuno et al. | 474/266 |

FOREIGN PATENT DOCUMENTS

| | | |
|---|---|---|
| EP | 0666433 A1 | 9/1995 |
| JP | 07138884 A | 5/1995 |

OTHER PUBLICATIONS

Costin, R. et al, Selecting Acrylic Type Coagents for Hose and Belt Applications, Nov. 22, 1999, pp. 1-10.

* cited by examiner

*Primary Examiner* — Michael Tolin
(74) *Attorney, Agent, or Firm* — Alvin T. Rockhill

(57) ABSTRACT

The present invention is directed to timing belts having improved fabric adhesion to the tooth facing which can be achieved by the use of a combination of a RFL treated fabric and an EPDM body provided the RFL treatment or the body include ZDA or the RF latex is an X-HNBR latex.

10 Claims, No Drawings

FABRIC ADHESION IMPROVEMENT FOR EPDM BASED LOW COST TIMING BELT

This is a divisional of U.S. patent application Ser. No. 11/026,786, filed on Dec. 31, 2004 now U.S. Pat. No. 7,909,720. The teachings of U.S. patent application Ser. No. 11/026,786 are incorporated herein by reference in their entirety.

BACKGROUND OF THE INVENTION

This invention is directed to belting for use as timing belts, which incorporate a cloth or fabric layer on the teeth of the belt, and to improved fabric adhesion, when the belt is an ethylene-alpha-olefin elastomeric composition, such as EPDM (ethylene propylene diene terpolymer, by the use of, preferably, a combination of the use of a resorcinol formaldehyde lates (RFL) treatment for the fabric and the use of zinc diacrylate (ZDA).

Ethylene-alpha-olefin elastomeric compositions, which are readily processed, should have adequate mechanical properties in dynamic applications and acceptable adhesion to textile reinforcement materials to enable its use as the primary base elastomeric composition in applications such as belting including power transmission and flat belting, air springs, engine mounts. But they have not found much success.

The use of salts of alpha, beta-unsaturated organic acids in elastomeric compositions is known. For example, Yarnell et al (U.S. Pat. No. 5,610,217), teaches an elastomeric material for use as the primary elastomeric composition in articles subject to dynamic loading, which comprises an ethylene-alpha-olefin elastomers composition capable of maintaining excellent abrasion resistance, pilling resistance, tensile strength, cut-growth resistance, modulus and adhesion to reinforcement materials under high and low temperature dynamic loading conditions. The elastomeric material is cured using a free radical promoting material, and comprises the reaction product of 100 parts by weight of an ethylene-alpha-olefin elastomers which serves as the primary elastomers of the composition, from about 1 to about 30 parts per hundred weight of the elastomers (phr) of a metal salt of an $\alpha$-$\beta$-unsaturated organic acid, which includes zinc diacrylate, although zinc dimethacrylate is most preferred, and from about 25 to about 250 phr of a reinforcing filler.

The use or resorcinol-formaldehyde latex is known also for use in treating fabrics. For example, Knuston (U.S. Pat. No. 6,695,733) teaches treating carbon fiber tensile cord with RFL in making low growth power transmission belts. Fujumoto et al, U.S. Pat. No. 6,641,905, also teaches RFL treated polyester fiber cords for use in power transmission belts wherein the rubber latex is a chlorosulfonated polyethylene and alkylated chlorosulfonated polyethylene. Fujita et al, U.S. Pat. No. 5,609,243, teaches RFL treated fabric for toothed conveying belts. Takada et al, U.S. Pat. No. 6,294,600, teaches ethylene-$\alpha$-olefin elastomers and N,N'-m-phenylene dimaleimide compositions surfaced by RFL treated canvas cloth for use as power transmission belting. Hasaka et al, U.S. Pat. No. 6,524,417 teaches the use of RFL treated fiber material for use in ethylene-$\alpha$-olefin elastomers latex which is cured by vulcanization bonding and used in power transmission belts. Di Meco et al, U.S. Pat. No. 6,656,073, teaches a toothed belt where the toothed portion is covered with a cloth having a specific weft and warp design for the cloth, but where the cloth is treated with a RFL composition.

SUMMARY OF THE INVENTION

The present invention is the result of the discovery that timing belts having improved fabric adhesion to the tooth facing can be achieved by the use of a combination of a RFL treated fabric and an EPDM body provided the RFL treatment or the body include ZDA or the RF latex is an X-HNBR latex.

The present invention more specifically discloses a method of making a toothed belt comprising: (1) forming a body having a length, laterally spaced sides, and inside and an outside surface, and defining a plurality of teeth spaced in a lengthwise direction on one of the inside or the outside of the body, said body defining at least in part by a rubber composition comprising at least an ethylene propylene diene monomer terpolymer, and (2) applying a cloth layer on the teeth on one of the inside or outside of the body, and bonding said cloth layer to said body whereby the cloth layer is disposed on the surface of and adhered to the teeth, said cloth layer being treated with a solution of resorcin-formalin-latex, wherein the mole ratio of the resorcin to formalin is within the range of 1:1 to 1:3, wherein the latex in the resorcin-formalin-latex consists of a carboxylated hydrogenated nitrile rubber latex, and wherein the rubber composition and the solution for treating said cloth layer are void of metal salts of $\alpha,\beta$-unsaturated organic acids.

DETAILED DESCRIPTION OF THE INVENTION

A typical synchronous belt includes an elastomeric main belt body portion and a sheave contact portion positioned along the inner periphery of the main belt body portion. The word "sheave" in this context includes normal pulleys and sprockets used with power transmission belts, and also pulleys, rollers and like mechanisms used with conveyor and flat belting. Examples of a sheave and belt system are illustrated in U.S. Pat. Nos. 4,956,036 and 5,610,217, and the contents of which are hereby incorporated by reference. The particular sheave contact portion can take the form of alternating teeth and land portions. A tensile layer is positioned within the main belt body portion for providing support and strength to the belt, and can be, for example, in the form of a plurality of strain-resisting cords aligned longitudinally along the length of the main belt body portion. But, any type of tensile layer known to the art may be utilized and any desired material may be used as the tensile member, such as cotton, rayon, nylon, polyester, Aramid, steel, fiberglass, carbon and even discontinuous fibers oriented for load carrying capability.

The main belt body portion is a flex fatigue resistant, abrasion resistant, high tensile strength, high modulus elastomeric composition. The main belt body portion is prepared from an ethylene-alpha-olefin elastomer which has been cured with a free-radical promoting material. A tensile member is disposed within the body portion, and a sheave contact portion is integral with the main belt body portion. The elastomeric composition is formed by mixing and milling together in accordance with conventional rubber processing practice a resin mixture comprising, by weight, 100 parts of an ethylene-alpha-olefin elastomer which serves as the primary elastomer of the composition, from about 1 to about 30 phr of a metal salt of an $\alpha,\beta$-unsaturated organic acid, and from about 25 to about 250 phr of a reinforcing filler. This elastomeric material when cured exhibits excellent adhesion to the belt's tensile member in the substantial absence of additional adhesion promoters.

The ethylene-alpha-olefin elastomeric compositions may optionally contain other conventional additives which are commonly utilized in elastomer compositions. Such additives may include process and extender oils, antioxidants, waxes, pigments, plasticizers, softeners and the like. These additives may be employed in amounts conventionally used in standard rubber compounds.

A reinforcing fabric is utilized and intimately fits along the alternating teeth and land portions of the belt to form a face cover therefor. This fabric may be of any desired configuration such as a conventional weave consisting of warp and weft threads at any desired angle or may consist of warp threads held together by spaced pick cords, or of a knitted or braided configuration, and the like. The fabric may be friction- or skim-coated with the same or different elastomer composition of the body. More than one ply of fabric may be employed. If desired, the fabric may be cut on a bias so that the strands form an angle with the direction of travel of the belt. Conventional fabrics may be employed using such materials as cotton, polyester, polyamide, hemp, jute, fiberglass and various other natural and synthetic fibers. In a preferred embodiment of the invention, the fabric layer consists of an expansible wear-resistant fabric in which at least one of the warp or weft threads is made of nylon. In the most preferred form, the fabric layer is made of nylon 66 stretch fabric.

The wear resistant fabric is disposed at the peripheral surface of the belt teeth for promoting tooth sheer strength and, in castable belt constructions in particular, for reducing aggressiveness of the belt teeth when entering grooves of a sprocket, any suitable or conventional material may be employed, including crimped nylon, cotton, hemp, jute, aramid, polyester, and fiberglass. More than one ply of fabric may be employed. If desired the fabric may be cut on a bias so that the strands form an angle with the direction of travel of the belt. The fabric may be of any desired configuration such as a conventional weave consisting of warp and weft threads at any desired angle, or may consist of pick cords, or of a knitted or braided configuration or the like.

The ethylene-alpha-olefin elastomers useful in the present invention include but are not limited to copolymers composed of ethylene and propylene units (EPM), ethylene and butene units, ethylene and pentene units, or ethylene and octene units (EOM), and terpolymers composed of ethylene and propylene units and an unsaturated component (EPDM), as well as mixtures thereof. As the unsaturated component of EPDM, any appropriate non-conjugated diene may be used, including for example, 1,4-hexadiene, dicyclopentadiene or ethylidenenorbomene (ENB). The ethylene-alpha-olefin elastomer preferred in the present invention contains from about 35% by weight to about 80% by weight of the ethylene unit, from about 65% by weight to about 25% by weight of the propylene or octene unit, and 0-10% by weight of the unsaturated component. In a more preferred embodiment, the ethylene-alpha-olefin elastomer contains from about 55% to about 78% by weight of the ethylene unit, and in a most preferred embodiment, the ethylene-alpha-olefin elastomer contains from about 65% to about 75% of the ethylene unit. At these more preferred ethylene unit content levels, endless belts incorporating as their main belt body portions the ethylene-alpha-olefin elastomer compositions of this preferred embodiment of the present invention exhibit improved pilling resistance. The most preferred ethylene-alpha-olefin elastomer is EPDM.

To form the elastomer composition of the present invention the ethylene-alpha-olefin elastomer may optionally be blended with less than 50% by weight, more preferably up to about 25%, and most preferably from about 5% to about 10% based on the total elastomeric content of the composition of a second elastomeric material including but not limited to silicone rubber, polychloroprene, epichlorohydrin, hydrogenated nitrile butadiene rubber, natural rubber, ethylene-vinyl-acetate copolymer, ethylene methacrylate copolymers and terpolymers, styrene butadiene rubber, nitrile rubber, chlorinated polyethylene, chlorosulfonated polyethylene, alkylated chlorosulfonated polyethylene, transpolyoctenamer, polyacrylic rubbers, butadiene rubber, and mixtures thereof, to fine-tune certain mechanical properties such as high temperature performance and tack.

The ethylene-alpha-olefin elastomeric compositions useful in the endless belts of the present invention further comprise from about 25 to about 250 phr and preferably from about 25 to about 100 phr of a reinforcing filler such as carbon black, calcium carbonate, talc, clay or hydrated silica, or mixtures of the foregoing. The incorporation of from 1 to 30 phr of a metal salt of an unsaturated organic acid and from about 25 to about 250 phr and preferably about 25 to about 100 phr of reinforcing filler in the peroxide-cured ethylene-alpha-olefin elastomeric composition preserves the heat stability of conventional peroxide-cured elastomers, while providing the tear strength and dynamic properties usually associated with sulfur cured elastomers.

The free-radical producing curatives useful in the present invention are those suitable for curing ethylene-alpha-olefin elastomers and include for example, organic peroxides and ionizing radiation. The preferred curative is an organic peroxide, including but not limited to dicumyl peroxide, bis-(t-butyl peroxy-diisopropyl benzene, t-butyl perbenzoate, di-t-butyl peroxide, 2,5-dimethyl-2,5-di-t-butylperoxyhexane, $\alpha,\alpha$-bis(t-butylperoxy) diisopropylbenzene. The preferred organic peroxide curative is $\alpha$-$\alpha$-bis(t-butylperoxy) diisopropylbenzene. Cure-effective amounts of organic peroxide for purposes of the present invention are typically from about 2 to about 10 phr. Preferred levels of organic peroxide are from about 4 to about 6 phr. Sulfur may optionally be added to the organic peroxide curative as part of a mixed cure system in an amount of from about 0.01 to about 1.0 phr, to improve the cured elastomer's Young's modulus without negatively affecting its tear resistance.

Other conventional ethylene-alpha-olefin elastomer additives, process and extender oils, antioxidants, waxes, pigments, plasticizers, softeners and the like may be added according to common rubber processing practice without departing from the present invention. For example, in a preferred embodiment of the present invention, the elastomeric composition also contains from about 0.5 to about 1.5 phr of an antiozonant or antioxidant and from about 5 to about 15 phr of a paraffinic petroleum oil plasticizer/softener.

The ethylene-alpha-olefin elastomeric compositions useful in the present invention may be prepared by any conventional procedure such as for example, by mixing the ingredients in an internal mixer or on a mill.

The RFL composition, i.e., an elastomer latex composition further comprising a resorcinol-formaldehyde reaction product, is applied as a cord treatment to at least a portion of the yarn and/or one or more of its carbon filaments. Throughout the present disclosure, the term, "cord treatment" is used to denote a material applied to a yarn and/or yarn filament (which may or may not include a sizing) and located at least on a portion of the yarn- and/or yarn filament surface and within at least a portion of one or more interstices formed between such filaments and yarn(s) of a cord formed through the bundling and/or twisting and/or other combination or configuration of such cord-treated yarn; and being applied to such yarn and/or yarn filament at a level greater than 2.0% based on the final weight of the so treated cord.

As the RFL constituents, any suitable materials may be employed. The RFL solid solution is made up of solid RF and latex resin, were the RFL solution is an initial condensate of resorcin and formalin mixed in latex, with the mole ratio of the resorcin and the formalin being 1 to 1 to 3. The weight percent ratio of the initial condensate of resorcin and formalin and the latex is 1 to 1 to 10. The resorcinol-formaldehyde resin fraction in the RFL solution preferably represents from about 2 to about 40% by weight dry basis, with the latex fraction representing from about 60 to about 98%. Preferably, the resorcinol-formaldehyde resin fraction represents from 5 to 40% by weight dry basis, and the latex fraction represents from 70 to 95%.

The latex component in the RFL solution may be of any suitable type, including hydrogenated nitrile rubber (HNBR), nitrile rubber (NBR), carboxylated HNBR (X-HNBR), carboxylated NBR, vinyl pyridine/styrene butadiene rubber ("VP/SBR"), carboxylated VP/SBR, SBR, chlorosulfonated polyethylene ("CSM"), ethylene alpha-olefin-type elastomer such as ethylene propylene diene terpolymer ("EPDM") and ethylene propylene copolymer ("EPM"), or a combination of any two or more of the foregoing. In a preferred embodiment, the latex component is a carboxylated HNBR type, and may include minor to up to equal amounts or proportions by weight or more of other elastomer types, including ethylene alpha-olefin-type elastomers such as EPDM or EPM. Ethylene alpha olefin elastomer may be utilized singly or in combination of any two or more thereof to improve low temperature performance properties of the resultant belt, such as low temperature flexibility.

To make the X-HNBR RFL, aqueous ammonia was added to the water and stirred until blending was complete. Then, resorcinol/formaldehyde resin was added to the thus-formed solution and was mixed until the resin was completely dissolved. The resulting resin mixture was adjusted as required with additional aqueous ammonia to a final pH of at least 9.0. This resin mixture was then added to carboxylated HNBR latex and mixed until blending was complete. At that point the formaldehyde was added to the solution with stirring and the resultant solution was mixed well. The mixture was then aged for at least two hours, and the pH of the solution was adjusted as necessary with aqueous ammonia to a final pH of 9.0.

In addition, X-HNBR RFL may include 4.3% by wet weight (18 parts by weight) of a 45% solids HEVEAMUL M-111 b wax dispersion by Heveatex, 6.50% by wet weight (27.2 parts by weight) of a 41% aqueous urea solution, and 2% by wet weight (8.4 parts by weight) of an antioxidant available under the name, AQUANOX 29 by Goodyear Chemical Co. These three constituents, i.e., wax, urea and antioxidant, are not required in the RFL solutions in accordance with the present invention, but may optionally be employed as process aids and/or, in the case of the antioxidant, to modify material handling and properties not related to the scope of the present invention.

The metal salts of $\alpha$-$\beta$-unsaturated organic acids useful in the present invention are metal salts of acids such as for example, acrylic, methacrylic, maleic, fumaric, ethacrylic, vinyl-acrylic, itaconic, methyl itaconic, aconitic, methyl aconitic, crotonic, alpha-methylcrotonic, cinnamic, and 2,4-dihydroxy cinnamic acids. These salts may be of zinc, cadmium, calcium, magnesium, sodium or aluminum, and are preferably those of zinc. The preferred metal salts of $\alpha$-$\beta$-unsaturated organic acids are zinc diacrylate and zinc dimethacrylate. The most preferred metal salt of unsaturated organic acid is zinc dimethacrylate. Amounts of the metal salt useful in the present invention may range from about 1 to about 30 phr, and are preferably from about 5 to about 20 phr. In the most preferred embodiment, the metal salt is zinc dimethacrylate used in an amount of about 5 phr when used in conjunction with EPDM mixed with up to about 10% of silicone rubber, and from about 10 to about 20 phr and more preferably about 15 phr when used in conjunction with the other ethylene-alpha-olefin elastomers useful in the present invention.

The cloth canvas layers may be cloth made by plain weaving, twill weaving, satin weaving, or the like, using threads formed from cotton, polyamide fiber, polyethylene terephthalate fiber, or aramid fiber.

The cloth is treated preferably as follows. The cloth is immersed in the RFL solution using a dip treatment for about 0.1 to 20 seconds and excess solution is removed by squeezing the cloth between a pair of rollers at a squeezing pressure of approximately 0.3 to 0.8 kgf/cm (gauge pressure). The cloth is then dried at about 100 to 200° C. for about 30 to 600 seconds. Additional RFL solution treatment is carried out until the solid adhered amount of RFL solution is 30 to 50 weight percent.

It has been found that when the RFL solution is less than 30 weight percent, the contacting portions of the warp and weft on the cloth tend to move to expand the openings bounded by the warp and weft. The openings between the warp and weft tend to expand, as a result of which the rubber surface becomes exposed. On the other hand, when the solid adhered amount of RFL solution exceeds 50 weight percent, the teeth lose their original, desired shape.

Example

In order to illustrate the present invention, fabric adhesion studies were conducted in which fabrics impregnated with RFL solution were adhered to EPDM rubber bodies. In these examples, a RFL impregnated fabric was adhered to an EPDM elastomeric sheet, and then tested to determine the bonding characteristics.

A single ply cotton canvas layer was laminated on the outer surface of an EPDM rubber layer. Prior to lamination the fabric was treated with an RFL solution (100 parts of hydrogenated nitrile (HNBR), about 20 parts of condensate of resorcin and formaldehyde, and zinc diacrylate (ZDA). The results are set forth in Table 1 which follows.

TABLE 1

| Example No. | Treatment of fabric as received | Treatment applied to fabric | Adhesion Evaluation |
| --- | --- | --- | --- |
| 1 | None | None | Inadequate Fabric Adhesion |
| 2 | RFL/HNBR | RFL and ZDA | Press 40 Min. @ 345° F.; Complete Rubber Tear, Chemical Adhesion |
| 3 | RFL/HNBR | RFL and 31 phr ZDA | PD Belt Build, 1 mil HDPE on madrel; Tooth formation acceptable; Lief 461, 466, 477, 502 Hours |

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What is claimed is:

1. A method of making a toothed belt comprising: (1) forming a body having a length, laterally spaced sides, and inside and an outside surface, and defining a plurality of teeth spaced in a lengthwise direction on one of the inside or the outside of the body, said body defining at least in part by a rubber composition comprising at least an ethylene propylene diene monomer terpolymer, (2) applying a cloth layer on the teeth on one of the inside or outside of the body, and bonding said cloth layer to said body whereby the cloth layer is disposed on the surface of and adhered to the teeth, said cloth layer being treated with a solution of resorcin-formalin-latex, wherein the solution of resorcin-formalin-latex consists of a reaction product of resorcin and formalin, a carboxylated hydrogenated nitrile rubber latex, ammonia, optionally a wax, optionally urea, and optionally an antioxidant, wherein the mole ratio of the resorcin to the formalin is within the range of 1:1 to 1:3, and wherein the rubber composition and the solution for treating said cloth layer are void of metal salts of $\alpha,\beta$-unsaturated organic acids.

2. The method of claim 1 wherein the rubber composition includes at least one reinforcing filler.

3. The method of claim 2 wherein the reinforcing filler is present at a level which is within the range of 25 phr to 250 phr.

4. The method of claim 2 wherein the reinforcing filler is present at a level which is within the range of 25 phr to 100 phr.

5. The method of claim 4 wherein the reinforcing filler is carbon black.

6. The method of claim 1 wherein the cloth layer is comprised of a cotton fabric.

7. The method of claim 1 wherein the cloth layer is comprised of a cloth fabric, and wherein the cloth fabric is made by plain weaving.

8. The method of claim 1 wherein the solution of resorcin-formalin-latex has a pH of at least 9.0.

9. The method of claim 1 wherein the rubber composition defining the body of the belt consists of the ethylene propylene diene terpolymer.

10. The method of claim 9 wherein the cloth layer is comprised of a single ply cotton fabric.

* * * * *